United States Patent
Eypasch et al.

(10) Patent No.: US 10,196,264 B2
(45) Date of Patent: Feb. 5, 2019

(54) REACTOR FOR RELEASE OF HYDROGEN FROM A LIQUID COMPOUND

(71) Applicant: Bayerische Motoren Werke Aktiengesellschaft, Munich (DE)

(72) Inventors: Martin Eypasch, Munich (DE); Michael Zenner, Munich (DE); Peter Wasserscheid, Erlangen (DE); Willi Peters, Erlangen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 114 days.

(21) Appl. No.: 15/003,507

(22) Filed: Jan. 21, 2016

(65) Prior Publication Data
US 2016/0137495 A1    May 19, 2016

Related U.S. Application Data

(63) Continuation of application No. PCT/EP2014/061839, filed on Jun. 6, 2014.

(30) Foreign Application Priority Data

Jul. 22, 2013  (DE) .......................... 10 2013 214 314

(51) Int. Cl.
*B01J 8/06*    (2006.01)
*B01J 19/24*    (2006.01)
(Continued)

(52) U.S. Cl.
CPC ............... *C01B 3/02* (2013.01); *B01J 8/0257* (2013.01); *B01J 8/0469* (2013.01); *B01J 8/06* (2013.01);
(Continued)

(58) Field of Classification Search
None
See application file for complete search history.

(56) References Cited

U.S. PATENT DOCUMENTS 4,402,870 A * 9/1983 Schurmans ............ B01J 23/755
428/156
6,497,856 B1 * 12/2002 Lomax, Jr. ............ B01J 8/0005
252/373
(Continued)

FOREIGN PATENT DOCUMENTS

DE            4306648 A1 * 9/1994 .............. B01J 8/008
DE      199 53 641 A1     6/2001
(Continued)

OTHER PUBLICATIONS

Machine Translation in English for DE 4306648 A1 (Sep. 1994).*
(Continued)

*Primary Examiner* — Jennifer A Leung
(74) *Attorney, Agent, or Firm* — Crowell & Moring LLP

(57) ABSTRACT

A reactor configured to release hydrogen from a hydrogen-bearing, liquid compound, having a reactor vessel which comprises at least one body with metallic support structure. A solid, highly porous coating is applied on said at least one body which comprises catalytically acting substances for the release of hydrogen from the liquid, hydrogen-bearing compound, wherein the at least one body with metallic support structure comprises at least one cutout with a volume that remains the same or becomes larger from along a cross-sectional dimension extending from bottom to top, based on the reactor vessel.

17 Claims, 2 Drawing Sheets

(51) Int. Cl.
*C01B 3/02* (2006.01)
*B01J 8/02* (2006.01)
*B01J 8/04* (2006.01)
*B01J 16/00* (2006.01)
*B01J 19/00* (2006.01)
*C01B 3/22* (2006.01)

(52) U.S. Cl.
CPC ............ *B01J 8/067* (2013.01); *B01J 16/005* (2013.01); *B01J 19/0013* (2013.01); *B01J 19/2415* (2013.01); *B01J 19/2425* (2013.01); *C01B 3/22* (2013.01); *B01J 2208/06* (2013.01); *B01J 2208/065* (2013.01); *B01J 2219/00085* (2013.01); *B01J 2219/185* (2013.01); *C01B 2203/02* (2013.01); *C01B 2203/06* (2013.01); *C01B 2203/066* (2013.01); *C01B 2203/1005* (2013.01); *C01B 2203/1035* (2013.01)

(56) References Cited

U.S. PATENT DOCUMENTS

| | | | |
|---|---|---|---|
| 7,070,743 B2 | 7/2006 | Blackwell et al. | |
| 7,207,323 B1 * | 4/2007 | Hemsath | C01B 3/26 123/543 |
| 2007/0172403 A1 * | 7/2007 | Lim | B01J 7/02 422/211 |
| 2010/0038593 A1 | 2/2010 | He et al. | |
| 2011/0268631 A1 | 11/2011 | Jankowski | |

FOREIGN PATENT DOCUMENTS

| | | |
|---|---|---|
| DE | 10 2008 034 221 A1 | 1/2010 |
| DE | 10 2010 038 491 A1 | 2/2012 |
| DE | 10 2011 079 858 A1 | 1/2013 |
| EP | 0 349 011 A1 | 1/1990 |
| EP | 1 475 349 A2 | 11/2004 |
| EP | 1 770 059 A1 | 4/2007 |
| WO | WO 2006/117572 A1 | 11/2006 |
| WO | WO 2008/057335 A2 | 5/2008 |

OTHER PUBLICATIONS

Machine Translation in English for DE 102011079858 A1 (Jan. 2013).*
PCT/EP2014/061839, International Search Report dated Sep. 5, 2014 (Two (2) pages).
German Search Report issued in German counterpart application No. 10 2013 214 314.1 dated Mar. 27, 2014, with Statement of Relevancy (Six (6) pages).

* cited by examiner

REACTOR FOR RELEASE OF HYDROGEN FROM A LIQUID COMPOUND

CROSS REFERENCE TO RELATED APPLICATIONS

This application is a continuation of PCT International Application No. PCT/EP2014/061839, filed Jun. 6, 2014, which claims priority under 35 U.S.C. § 119 from German Patent Application No. 10 2013 214 314.1, filed Jul. 22, 2013, the entire disclosures of which are herein expressly incorporated by reference.

BACKGROUND AND SUMMARY OF THE INVENTION

The invention relates to a reactor for releasing hydrogen from liquid compounds in accordance with the preamble of the first claim, and to a method for supplying fuel or energy to a consumer by means of the reactor.

Present-day scenarios for the provision of energy from regenerative sources on a large scale, examples being wind farms in the North Sea or Desertec, require, as an essential technical prerequisite, suitable pathways to enable very largely loss-free storage and transportation of large quantities of energy. Only in this way is it possible to compensate seasonal fluctuations in generation; only in this way is it possible to realize efficient transport of the useful energy over large distances.

A preferred approach to the technical realization of an energy transport and energy storage system is the charging of a low-energy substance A with hydrogen to form an energy-rich substance B, with the hydrogen needed for this procedure being provided from the electrolysis of water by means of electrical energy which is preferably regeneratively produced. This energy charging operation takes place typically, according to the prior art, by a catalytic hydrogenation reaction under pressure. The energetic discharging of the substance B is accomplished by catalytic dehydrogenation at low pressures and high temperatures. The hydrogen which is released again in this procedure can be utilized energetically in, for example, a fuel cell or a combustion engine. If the release of hydrogen takes place onboard a vehicle, the hydrogen provided in this case can be utilized directly for the operation of the vehicle. Examples known from the prior art include the storage of energy in the form of $CH_4$, $NH_3$, or methanol. Hydrogen discharge from these compounds yields the gaseous substances $CO_2$—in the case of methane and methanol—or nitrogen—in the case of $NH_3$.

An alternative known concept, in which the low-energy form A constitutes a liquid and, accordingly, the energetic discharge gives a liquid again, is described by DE 10 2008 034 221 A1. In this case, the low-energy form A can be stored and transported as a liquid, in order to be charged with hydrogen again at an energy-rich time and at an energy-rich location. Systems of this kind are referred to as Liquid Organic Hydrogen Carriers (LOHCs). Examples of such LOHCs are disclosed in patent application EP 1 475 349 A2.

In the LOHC systems known from the prior art, substance pairings are preferably those in which the low-energy substance A represents a high-boiling, functionalized aromatic compound, which is hydrogenated in the energetic charging operation. According to the prior art, reaction systems for the catalytic release of hydrogen from liquid energy storage molecules consist of fixed bed reactors or slurry phase reactors. In both stated reaction systems, the efficient introduction of heat into the reactor causes difficulties, since the heat has to be transported over relatively long distances to the location of reaction by media whose thermal conduction is poor. Moreover, the efficiency of the two stated reaction systems is severely impaired by the large amount of hydrogen gas formed in the dehydrogenating discharge. For this reaction, in the fixed bed or slurry phase reactors known from the prior art, the catalytically active surfaces are "blown free", meaning that the contact between the catalytic surface and the liquid to be discharged is greatly hindered by gas that has already formed. As a result, the rate of release of hydrogen is severely retarded, necessitating a larger release apparatus for a specified output.

It is an object of the present invention to provide a reactor for the release of hydrogen that overcomes the above drawbacks of the prior art. And also a method for supplying a consumer with hydrogen through the operation of the reactor.

According to the invention, a reactor for releasing hydrogen from a hydrogen-bearing, liquid compound, having a reactor vessel which comprises at least one body with metallic support structure, there being applied on said body a solid, highly porous coating which comprises catalytically acting substances for the release of hydrogen from the liquid, hydrogen-bearing compound is characterized in that the body with metallic support structure possesses at least one cutout, with a volume which increases from bottom to top, based on the reactor vessel and the geodetic height. A cutout of this kind, which increases in size from bottom to top, is advantageous for the operation of the reactor, particularly for the taking of the hydrogen from the catalyst body, thus from the catalytically active surfaces of the body with metallic support structure, especially when a vertical operational position of the reactor is selected. Because of the uplift, the hydrogen is able to escape rapidly to the top, and the cutout in the body with metallic support structure means that there is little flow resistance to the uplift force, thereby accelerating the escape of the hydrogen from the reactor and hence the process of hydrogen release, and also increasing the contact area between the catalyst and the liquid hydrogen-bearing compound. The cutouts in the body with metallic support structure can be coordinated in such a way that their increase in volume from bottom to top corresponds, or increases in proportion, substantially to the increasing volume of the hydrogen to be taken off.

In preferred versions of the invention, the cutout in the body with metallic support structure has a conical or frustoconical design, with a downwardly directed point to the cone. As an alternative to this, however, the cutout may also be cylindrical in design, with the cylinder circumference increasing in step fashion from bottom to top. If the reactor vessel possesses a longitudinal axis which extends perpendicularly from bottom to top, it is very advantageous if the longitudinal axis of the reactor vessel is congruent with the longitudinal axis of the cutout. Accordingly the body with metallic support structure and its cutout can be designed and produced symmetrically with respect to the longitudinal axis thereof.

According to one advantageous embodiment of the invention, the reactor vessel is a tube bundle of tubes connected in parallel, the individual tubes of said bundle, held at a distance from one another, each comprising at least one body having a cutout, there being a flow of the hydrogen-bearing compound around said body in the respective tube, with a process of heat exchange between the tube bundle and its surroundings bringing said bundle to reaction temperature, by subjecting its outer surface to the action of a heating medium, in a housing which is fluidtight for the heating medium, having at least one feed opening, one drain opening and one feed collection chamber for the heating medium.

Advantageously, in this way, on account of the tube bundle, the hydrogen release unit may take on other functions—for example, in the context of phase separation and of heat supply. Accordingly the entire apparatus with a plurality of integrated functions can be realized in one component. It is even more advantageous for the operation of the reactor, particularly for the taking of the hydrogen from the catalyst body, if the operational position of the reactor is selected such that the tubes of the tube bundle extend vertically. In this way, by virtue of the uplift, the hydrogen is able to escape rapidly upwardly in the cutout, thereby accelerating the heat transfer in the tube bundle and hence the process of hydrogen release, and making them more effectively controllable via the heating medium.

In particularly advantageous versions of the invention, the reactor is characterized in that the tubes of the tube bundle are connected by heat transfer lamellae. If these lamellae are then impervious to the heating medium, and the tubes of the tube bundle project through the heat transfer lamellae, the heating medium is able to transfer heat energy particularly effectively to the tubes of the tube bundle via the heat transfer lamellae, which then extend, in particular, horizontally. In this case, the heat transfer lamellae provide mechanical stabilization of the tube bundle, a fact which ultimately, at high temperatures, permits weight savings to be made with regard to the reactor, in turn implying effective heat transfer to the hydrogen-bearing compound.

It is further advantageous if a guide means is provided for the heating medium and diverts said heating medium in its flow direction, in the housing in the region of the tube bundle, in such a way that the tubes of the tube bundle are subjected to the action of the flow of the heating medium in each case over part of their length, with a different direction of flow in each case. In this way, the amount of heating medium needed is substantially reduced, in conjunction with improved heat exchange, since the heating medium flows through the tube bundle a number of times and so spends a longer, heat-delivering time in the reactor. In constructional terms it is particularly advantageous if the guide means connects defined heat transfer lamellae outside the tube bundle in such a way as to reverse the direction of flow. This is possible, for example, by means of tube halves which, bridging a plurality of heat transfer lamellae, are mounted by their two cut edges in axial direction on one longitudinal edge in each case of a heat transfer lamella. Where two tube halves are mounted on the heat transfer lamellae, in each case on opposite sides of the tube bundle in vertical direction, in particular with an offset by their radius, the flow of the heating medium is altered twice in its direction, the heating medium being guided through the tube bundle three times for heat exchange, with the heating medium able to flow into the reactor on one side and leave it on the opposite side, entailing a simple construction for the reactor and minimizing flow losses therein. Especially if the heating medium is a hot gas.

With a reactor constructed in this way it is advantageously possible for hydrogen to be released with high efficiency from the hydrogen-bearing compound, by means of catalytic dehydrogenation at high temperature and low pressure, with this hydrogen, ascending upwardly in the tubes, being taken off through the upwardly enlarging cutout, more particularly together with the liquid compound since dehydrogenated in the reactor, for the purpose of subsequent separation.

An advantageous method for supplying a consumer at least proportionally with hydrogen, said consumer being a consumer which burns fuel in a combustion chamber, and more particularly being an internal-combustion engine or fuel cell of a motor vehicle or of a stationary consumer, by means of the reactor, may be characterized in that the reactor is supplied with a hydrogen-bearing compound from a first storage tank thereof via a feed line, and the compound dehydrogenated at high temperature and low pressure is then led off via a drain line from the reactor into a second storage tank, the reactor supplying a combustion chamber of the consumer with hydrogen via a connecting line.

The concept of "energy-bearing substances" that is employed here has the advantage that in technical terms it is close to our existing supply of energy through fossil energy sources, particularly crude oil, and that it is therefore possible for the existing infrastructure to be utilized, such as ships, refineries, and filling stations. By way of "energy-bearing substances" it is possible in particular to store energy excesses from regenerative production and to link them with the energy demand for mobility, electrical installations, heating, and transport in the present infrastructure. Chemical energy storage media also have the following advantages: a virtually unlimited, loss-free storage capacity, a high energy density, and low costs. Such energy-bearing substances are suitable as a long-term storage medium and form of transport of energy.

A preferred exemplary embodiment of the invention is set out in more detail in the description below and in the associated drawing, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
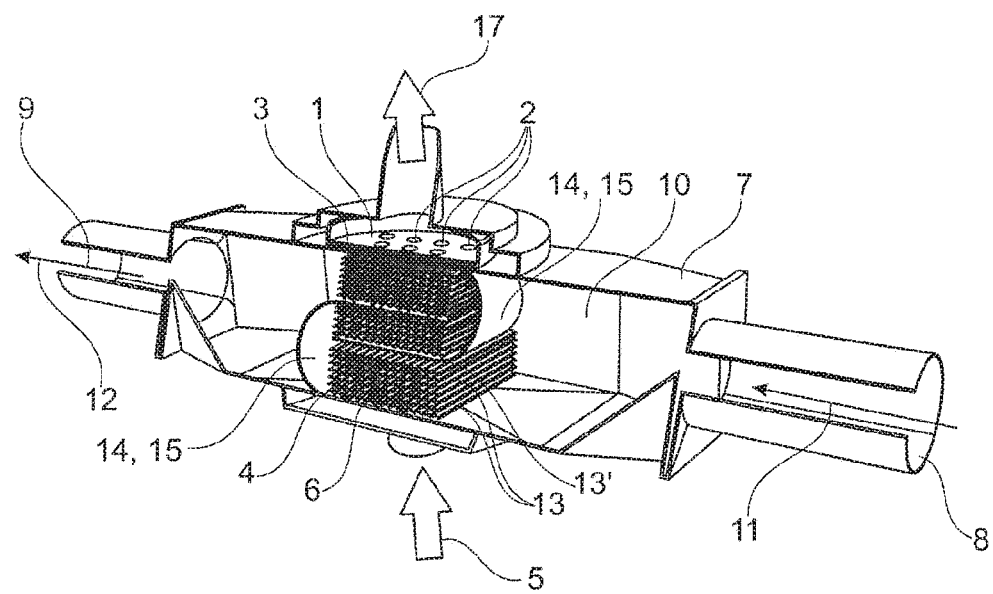
FIG. 1 shows a three-dimensional representation, cut away in the longitudinal direction, of a reactor of the invention
Figure 2:
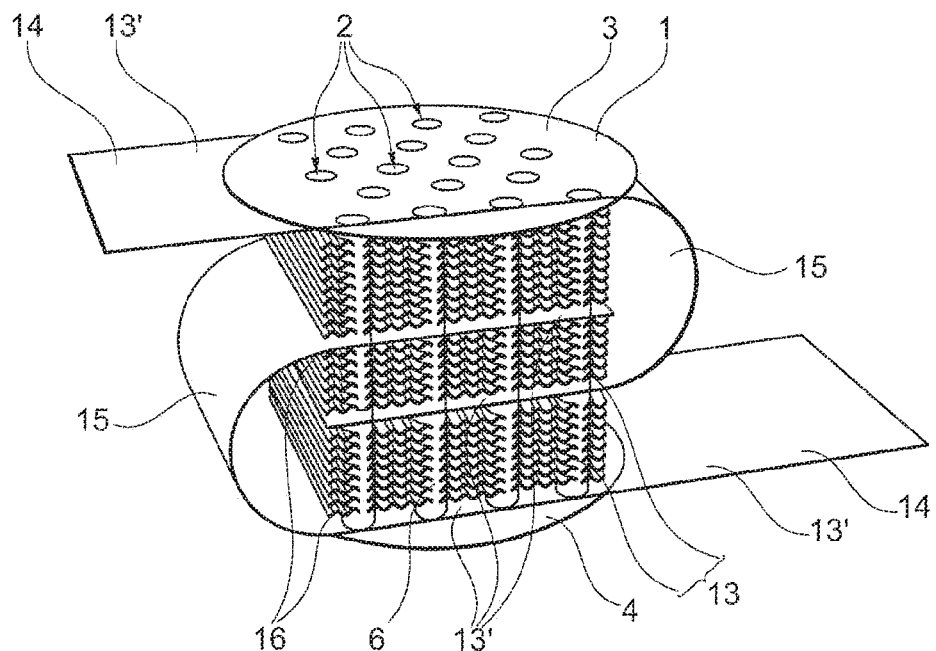
FIG. 2 shows an enlarged representation of a tube bundle of the reactor from FIG. 1, with heat transfer lamellae and guide means

FIG. 1 shows a reactor for releasing hydrogen from a hydrogen-bearing, liquid compound, having a reactor vessel 1 which comprises, as catalytic reaction systems, bodies (not shown) with metallic support structure, there being applied on said bodies a solid, highly porous coating which comprises catalytically acting substances for the release of hydrogen from the liquid, hydrogen-bearing compound. The reactor vessel 1 is a tube bundle 6 of tubes 2 which are connected in parallel, the individual tubes 2 of the bundle, which are held at a distance from one another by two fastening plates 3, 4, each comprising at least one body with metallic support structure, around which the hydrogen-bearing, liquid compound flows, represented symbolically by a flow directional arrow 5, in the respective tube 2, with a heat exchange process between the tube bundle 6 and its surroundings bringing the hydrogen-bearing compound 5 and the body with metallic support structure to reaction temperature in the tubes 2, by the outer surface of the tube bundle 6 being subjected to the action of a heating medium in a housing 7 which is fluidtight for the heating medium and has at least one feed opening 8, one drain opening 9, and one feed collecting chamber 10 for the heating medium. The heating medium here is heating gas and, represented symbolically by a flow directional arrow 11 at the hot gas entrance, of the feed opening 8 and, by a flow directional arrow 12, at the hot gas exit, of the drain opening 9. The reactor is shown in operational position, in which the tubes 2 of the tube bundle 6 extend vertically. Accordingly, by virtue of the uplift, the hydrogen is able to escape upward rapidly with the dehydrogenated liquid compound, represented symbolically by a flow directional arrow 17, and this accelerates heat transfer in the tube bundle 6 and hence the process of hydrogen release and makes them more effectively controllable via the heating medium.

The tubes 2 of the tube bundle 6 are connected by heat transfer lamellae 13. These lamellae are impervious to the heating medium and the tubes 2 of the tube bundle 6 project through these lamellae. As a result, the heating medium is able to transfer heat energy to the tubes 2 of the tube bundle 6 particularly effectively via the heat transfer lamellae 13, which in particular extend horizontally. Moreover, the heat transfer lamellae 13 provide mechanical stabilization of the tube bundle 6, a fact which ultimately enables weight savings to be made in terms of the reactor, at high temperatures, implying in turn effective heat transfer to the hydrogen-bearing compound.

Additionally provided is a guide means 14 for the heating medium, said means diverting the medium in its direction of flow in the housing 7, in the region of the tube bundle 6, in such a way that the tubes 2 of the tube bundle 6 are subjected to the flow of the heating medium 11 in each case over part of their length, with directions of flow that are different in each case. Accordingly, the amount of heating medium needed is substantially reduced, in conjunction with improved heat exchange, since the heating medium flows through the tube bundle 6 a number of times and hence spends a longer heat-delivery time in the reactor.

The guide means 14 joins defined heat transfer lamellae 13' outside the tube bundle 6, in such a way as to reverse the direction of flow, by tube halves 15 which, bridging a plurality of heat transfer lamellae, are mounted by their two cut edges 16 in axial direction on in each case one longitudinal edge of a heat transfer lamella 13'. Here, two tube halves 15 are mounted on the heat transfer lamellae 13', one each on opposite sides of the tube bundle 6, in vertical direction, offset by their radius. This changes the direction of the flow 11 of the heating gas twice, this gas being guided three times through the tube bundle 6 for heat exchange, with the heating gas then leaving the reactor on the side (arrow 12) opposite the inflow side (arrow 11).

Figure 3:
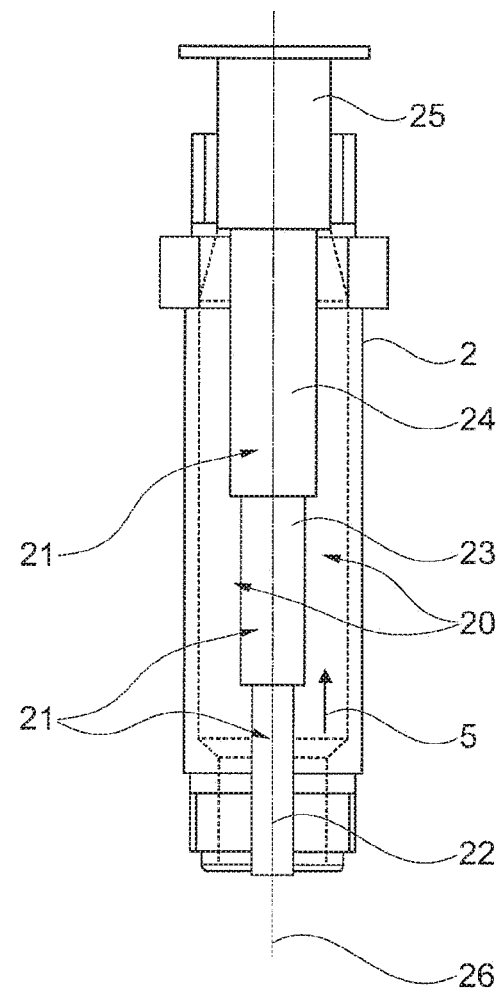
FIG. 3 shows an enlarged representation of a tube of the tube bundle of the reactor from FIG. 1, in section, with the feature of a stepped cutout.

FIG. 3 shows a tube 2 of the tube bundle 6 of the reactor 1 in a vertical arrangement for releasing hydrogen from the hydrogen-bearing, liquid compound, represented symbolically by the flow directional arrow 5. In the cavity of the tube 2, drawn with dashed lines, the porous body with metallic support structure is located, not shown, coated with the catalytically acting substances for the release of hydrogen from the liquid, hydrogen-bearing compound 5. This body, also referred to as catalyst structure 20, and produced, for example, by a rapid-prototyping technique, substantially fills the tube 2 cavity drawn with dashed lines, up to the cutout 21 made in the catalyst structure 20. This cutout 21 forms a gas channel whose volume, based on the reactor vessel 1 or tube 2, increases from bottom to top. The cutout 21, moreover, is cylindrical, for example, and the cylinder circumference increases in step fashion from bottom to top.

There are four cylinders drawn, 22, 23, 24, and 25, made centrally in the catalyst structure 20 as gas channel or cutout 21 along a longitudinal axis 26 of the tube 2 that extends perpendicularly from bottom to top, with the longitudinal axis 26 of the tube 2 being congruent with the longitudinal axis of the cutout 21, and with the operating position of the reactor being selected such that the tubes 2 of the tube bundle 6 and therefore the cutouts 21 extend vertically.

The cutout 21 introduced forms a gas channel and therefore improves the gas/liquid phase separation of the hydrogen from the hydrogen-bearing, liquid compound, represented symbolically by the flow directional arrow 5. By virtue of the free volume in the tube 2, the gas is able to escape more quickly into the free space and to leave the reaction volume, the coated catalyst structure 20. A negative pressure is produced whose effect is to quicken the discharge of the gas phase and also the separation of liquid phase and gas phase, since the gas looks for the path of least resistance. The liquid phase 5 spends longer in the reaction volume. This increases the efficiency of the catalytically active surface, since the contact time of the liquid phase 5 with the catalyst 20 is extended. This allows the constructional space of the reactor to be reduced and reduces the level of noble metal use for the catalyst structure 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reactor configured to release hydrogen from a hydrogen-bearing, liquid compound, comprising:
   a reactor vessel having at least one body with a metallic support structure coated with a solid, highly porous coating comprising catalytically acting substances that cause the release of hydrogen from the hydrogen-bearing, liquid compound in contact with the catalytically acting substance, and
   a cutout from the at least one body with the metallic support structure, the cutout defining a volume that becomes larger from along a cross-sectional dimension extending from bottom to top, relative to the reactor vessel.

2. The reactor as claimed in claim 1, wherein the cutout is one of conical and frustoconical, with a downwardly directed point to the cone.

3. The reactor as claimed in claim 1, wherein the cutout is cylindrical, with the cylinder circumference increasing in a step fashion along the cross-sectional dimension extending from bottom to top.

4. The reactor as claimed in claim 1, wherein the reactor vessel comprises a longitudinal axis which runs perpendicularly from bottom to top.

5. The reactor as claimed in claim 4, wherein the longitudinal axis of the reactor vessel is congruent with a longitudinal axis of the cutout.

6. The reactor as claimed in claim 1, wherein the reactor vessel is a tube bundle of individual tubes connected in parallel,
   wherein the individual tubes of said bundle are held at a distance from each other, each comprising at least one body having a cutout,
   wherein the hydrogen-bearing compound flows around each body in a respective tube while outer surfaces of each tube are subjected to a heating medium in a housing that is fluidtight for the heating medium, such action causing a heat exchange between the tube bundle and the heating medium, which brings the bundle to reaction temperature, and wherein the housing comprises at least one feed opening, one drain opening and one feed collection chamber for the heating medium.

7. The reactor as claimed in claim 2, wherein the reactor vessel is a tube bundle of individual tubes connected in parallel, wherein the individual tubes of said bundle are held at a distance from each other, each comprising at least one body having a cutout, wherein the hydrogen-bearing compound flows around each body in a respective tube while outer surfaces of each tube are subjected to a heating medium in a housing that is fluidtight for the heating medium, such action causing a heat exchange between the tube bundle and the heating medium, which brings the bundle to reaction temperature, and wherein the housing comprises at least one feed opening, one drain opening and one feed collection chamber for the heating medium.

8. The reactor as claimed in claim 3, wherein the reactor vessel is a tube bundle of individual tubes connected in parallel, wherein the individual tubes of said bundle are held at a distance from each other, each comprising at least one body having a cutout, wherein the hydrogen-bearing compound flows around each body in a respective tube while outer surfaces of each tube are subjected to a heating medium in a housing that is fluidtight for the heating medium, such action causing a heat exchange between the tube bundle and the heating medium, which brings the bundle to reaction temperature, and wherein the housing comprises at least one feed opening, one drain opening and one feed collection chamber for the heating medium.

9. The reactor as claimed in claim 6, wherein an operating position of the reactor is selected such that the individual tubes of the tube bundle extend vertically.

10. The reactor as claimed in claim 7, wherein an operating position of the reactor is selected such that the individual tubes of the tube bundle extend vertically.

11. The reactor as claimed in claim 8, wherein an operating position of the reactor is selected such that the individual tubes of the tube bundle extend vertically.

12. The reactor as claimed in claim 6, wherein the individual tubes of the tube bundle are connected by heat transfer lamellae.

13. The reactor as claimed in claim 12, wherein the heat transfer lamellae are impervious to the heating medium and the tubes of the tube bundle project through these lamellae.

14. The reactor as claimed in claim 6, wherein a guide means is provided for the heating medium and diverts said heating medium in its flow direction, in the housing in the region of the tube bundle, such that the individual tubes of the tube bundle are subjected to a flow of the heating medium over a part of a length of each respective individual tube, with a different direction of flow in each case.

15. The reactor as claimed in claim 14, wherein the guide means connects defined heat transfer lamellae outside the tube bundle so as to reverse the direction of flow.

16. The reactor as claimed in claim 6, wherein the heating medium is hot gas.

17. The reactor as claimed in claim 6, wherein hydrogen is released in the reactor from the hydrogen-bearing compound, by catalytic dehydrogenation under pressure and at high temperature, and is taken off in an upwardly ascending direction in the individual tubes.

* * * * *